3,403,148
PROCESS FOR THE MANUFACTURE OF 3-OXO - 7α - METHYL - 17 - ETHYLENE - DIOXY-$\Delta^{1,4}$-ANDROSTADIENE
Georg Anner, Basel, and Peter Wieland, Oberwil, Basel-Land, Switzerland, assignors to Ciba Corporation, New York, N.Y., a corporation of Delaware
No Drawing. Filed Feb. 2, 1966, Ser. No. 524,497
Claims priority, application Switzerland, Feb. 22, 1965, 2,429/65
4 Claims. (Cl. 260—239.55)

ABSTRACT OF THE DISCLOSURE

Process for the manufacture of a 3-oxo-$\Delta^{1,4}$-androstadiene by reaction of a 3-oxo-$\Delta^4$-androstene with an oxalic acid ester, subsequent bromination and splitting off of hydrogen bromide, wherein 3-oxo-7α-methyl-17-ethylenedioxy-$\Delta^4$-androstene is used as starting material. The compound of this invention is useful as an intermediate in the manufacture of 7α-methylestrone and its derivatives.

---

The present invention provides a process for the manufacture of 3-oxo-7α-methyl-17-ethylenedioxy-$\Delta^{1,4}$-androstadiene by introducing a double bond into the 1,2-position of the corresponding $\Delta^4$-androstene.

Various processes are known for introducing a double bond into the 1,2-position of 3-oxo-$\Delta^4$-androstenes, of which the dehydrogenation with a quinone, such as 2,3-dichloro-5,6-dicyanoquinone, is the simplest to perform and gives the best yield. While the dehydrogenation with selenium dioxide likewise gives good yields, the purification of the final products, which in most cases still contain organic seleno compounds, is extremely cumbersome and takes a long time. When 3-oxo-7α-methyl-17-ethylenedioxy-$\Delta^4$-androstene is reacted in the usual manner with a quinone, especially with 2,3-dichloro-5,6-dicyanoquinone, the yield obtained is about 45% of the theoretical. The resulting final products contain, inter alia, the corresponding $\Delta^{1,4,6}$-triene which itself can be converted into the $\Delta^{1,4}$-compound only in a complicated manner.

According to another method of introducing the 1,2-double bond in a 3-oxo-$\Delta^4$-steroid, the reaction is performed with an oxalic acid ester, followed by bromination and subsequent elimination of hydrogen bromide. Normally, this three-stage process gives only moderate yields.

It was surprising to observe that just this multi-stage reaction with 3-oxo-7α-methyl-17-ethylenedioxy-$\Delta^4$-androstene gives a very high yield and the 17-ethylenedioxy group is not affected in the course of this reaction.

According to the process of the present invention 3-oxo-7α-methyl-17-ethylenedioxy-$\Delta^4$-androstene is reacted in a known manner with an oxalic acid ester, the resulting ester is treated with bromine, and the halogen compound thus formed is reacted with a lithium salt, if desired or required in the presence of an alkali metal carbonate.

The reaction with the oxalic acid ester—e.g. an oxalic acid lower alkyl ester such as the methyl, ethyl, propyl, or benzyl ester—is performed in the usual manner, for example in the presence of a basic condensing agent. Suitable condensing agents are, above all, alcoholates, for example sodium methylate, sodium ethylate and potassium tertiary butylate.

The 2-oxalic acid ester thus formed is treated with bromine or a bromine donor, e.g. an N-halogen amide or imide, advantageously in the presence of a solvent that is inert towards bromine, such as a lower aliphatic alcohol, e.g. methanol or ethanol, if desired in admixture with a halogenated hydrocarbon, such as chloroform or carbon tetrachloride and in the presence of an alkali metal acylate, especially potassium acetate, the oxalic acid radical being split off.

A solvent that is particularly suitable for the introduction of the $\Delta^1$ double bond by elimination of bromine is dimethylformamide in which the lithium salts, such as the halides, especially lithium bromide or chloride, are likewise readily soluble. It is advantageous to add an alkali metal acylate, such as sodium acetate, potassium acetate or lithium acetate, or an alkali metal carbonate such as lithium carbonate, calcium carbonate, potassium carbonate or sodium carbonate.

The final product obtained by the present process is known. It is a valuable intermediate, for example for the manufacture of 7α-methylestrone and its derivatives.

The present invention further includes any modification of the process in which an intermediate obtained at any stage of the process is used as starting material and any remaining step/steps is/are carried out or the process is discontinued at any stage theerof, or in which the starting materials are formed in situ or are used in the form of their salts.

The following example illustrates the invention:

EXAMPLE

A mixture of 20 ml. of benzene, 2.6 g. of oxalic acid dimethyl ester and 605 mg. of sodium methylate is stirred for 15 minutes and 3.44 g. of 3-oxo-7α-methyl-17-ethylenedioxy-$\Delta^4$-androstene are added. The batch is stirred for 5 hours at 0° C. under nitrogen, and the clear yellow solution is left to itself for 18 hours at room temperature, then mixed with 0.6 ml. of glacial acetic acid, diluted with benzene and washed three times with dilute sodium chloride solution. The aqueous solutions are further extracted twice with benzene, dried and evaporated under vacuum at a bath temperature of 40 to 45° C. to remove the excess of oxalic acid dimethyl ester the residue is dried for one hour at 45° C. under a high vacuum. The substantially crystalline residue weighs 4.5 g.; it is mixed with about 10 ml of methanol, triturated with a glass rod and boiled for a short time, without however everything passing into solution. The batch is allowed to cool and kept for a prolonged time at about −10° C., filtered, and washed with methanol, at −5° C. to yield 3.74 g. of the crude oxalo ester melting at 129 to 131° C.

This oxalo ester is dissolved in 90 ml. boiling methanol; the solution is allowed to cool and 18 g. of dry potassium acetate are stirred in. While cooling with an ice+salt mixture and stirring, 32.5 ml. of an 0.54 N-solution of bromine in carbon tetrachloride are added within 25 minutes. Finally, the initially yellow reaction solution has turned colourless; it is stirred on for 4½ hours while allowing the internal temperature to rise slowly to −5° C. The reaction solution is diluted with 250 ml. of water and extracted with 3× 300 ml. of benzene. The organic solutions are washed with 300 ml. of 2% sodium bicarbonate solution and with 2× 250 ml. of water, dried and evaporated under vacuum at a bath temperature of 30° C. The oily residue is dissolved in 80 ml. of dimethylformamide, and while being stirred under nitrogen mixed with 4 g. of lithium carbonate and 4 g. of dry lithium bromide. The batch is stirred for 10 hours at an oilbath temperature of 120° C., and the lithium carbonate is suctioned off and washed with methylenechloride and water. The aqueous phase is twice extracted with methylenechloride, and the organic solutions are twice washed with water, dried and evaporated under vacuum. To remove any residual dimethylformamide the product is dissolved in xylene, once more evaporated under vacuum and this operation is repeated once more with benzene. A solution of the residue in benzene is filtered through 40 g. of alumina (activity II) and rinsed with 2 litres of benzene. The filtrate is evaporated under vacuum, the residue recrystallized from a mixture of ether+pentane, and there, are obtained 2.575 g. of 3-oxo-7α-methyl-17-ethylenedioxy-Δ$^{1,4}$-androstadiene melting at 167 to 168° C.

Chromatography of the mother liquors on 10 g. of alumina activity (II), elution with 160 ml. of a 1:1-mixture of benzene+petroleum ether and 80 ml. of benzene, followed by recrystallization from ether+petroleum ether, furnishes another 85 mg. of the identical compound melting at 157.5 to 163.5° C.

What is claimed is:

1. Process for the manufacture of a 3-oxo-Δ$^{1,4}$-androstadiene by reaction of a 3-oxo-Δ$^4$-androstene with an oxalic acid ester, subsequent bromination and splitting off of hydrogen bromide, wherein 3-oxo-7α-methyl-17-ethylenedioxy-Δ$^4$-androstene is used as starting material.

2. Process according to claim 1, wherein 3-oxo-7α-methyl-17-ethylenedioxy-Δ$^4$-androstene is reacted with an oxalic acid alkyl ester in the presence of an alcoholate, the resulting oxalic ester is treated with bromine in the presence of a lower aliphatic alcohol and a halogenated hydrocarbon, and a lithium halide allowed to act on the resulting halogen compound in the presence of lithium carbonate and dimethyl formamide.

3. Process according to claim 1, wherein oxalic acid dimethyl ester is used in the presence of sodium methylate.

4. Process according to claim 2 wherein oxalic acid dimethyl ester is used in the presence of sodium methylate.

References Cited

UNITED STATES PATENTS

| | | | |
|---|---|---|---|
| 3,010,960 | 11/1961 | Beal | 260—239.55 |
| 3,314,976 | 4/1967 | Hewett et al. | 260—397.3 |

OTHER REFERENCES

Djerassi et al.: J.A.C.S. 82, 5488–5493 (1960) QD1 A5 (p. 5492 relied on).

Hogg et al: J.A.C.S. 77, 4438–4439 (1955), QD1 A5.

Schaub et al.: J.A.C.S. 81, 4962–4968 (1959), QD1 A5 (pp. 4963–4963 relied on).

LEWIS GOTTS, *Primary Examiner.*

T. M. MESHBESHER, *Assistant Examiner.*